(12) United States Patent
Takagi et al.

(10) Patent No.: US 8,369,681 B2
(45) Date of Patent: Feb. 5, 2013

(54) VIDEO REPRODUCING APPARATUS

(75) Inventors: Toshihiro Takagi, Daito (JP); Kazuhiko Tani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 2989 days.

(21) Appl. No.: 10/854,212

(22) Filed: May 27, 2004

(65) Prior Publication Data

US 2004/0240841 A1 Dec. 2, 2004

(30) Foreign Application Priority Data

May 28, 2003 (JP) .................................. 2003-150146

(51) Int. Cl.
*H04N 9/80* (2006.01)
(52) U.S. Cl. ...................................... 386/241; 386/248
(58) Field of Classification Search .................... 386/83, 386/95, 112, 125–126, 240, 248, 291–299
See application file for complete search history.

(56) References Cited

U.S. PATENT DOCUMENTS 5,157,509 A * 10/1992 Takimoto et al. ............. 386/318
6,868,225 B1 * 3/2005 Brown et al. .................. 386/83

FOREIGN PATENT DOCUMENTS

| JP | 03-278347 | 12/1991 |
| JP | 9-107517 | 4/1997 |
| JP | 11-015844 | 1/1999 |

OTHER PUBLICATIONS

Japanese Office Action dated Dec. 26, 2006 with English translation (Five (5) pages).

* cited by examiner

*Primary Examiner* — Thai Tran
*Assistant Examiner* — Nigar Chowdhury
(74) *Attorney, Agent, or Firm* — Crowell & Moring LLP (57) ABSTRACT

When a mark key of a remote control is pressed by a user during fast-forward reproduction of video images and audio sounds, a system control unit searches a position of a video image which is presumed as a scene change closest to and on rewind side from the position of the video image reproduced at the time the mark key is pressed. This search is performed, based on rate of change in amount of data (bit rate) of the compressed video data used per unit time to generate the video signals by a video and audio signal processing unit. The system control unit then sets, as a mark position, the position of the video image presumed as the scene change.

5 Claims, 9 Drawing Sheets

VIDEO REPRODUCING APPARATUS

BACKGROUND OF THE INVENTION

1. Field of the Invention

The present invention relates to a video reproducing apparatus for reproducing video images recorded on a recording medium such as a hard disk, a digital video disk or the like.

2. Description of the Related Art

Conventionally, for example in a video reproducing apparatus such as a hard disk player or recorder, video image-related data and audio sound-related data are read from a built-in hard disk as a recording medium, and are used to generate video signals and audio signals. The video signals are output to a display, while the audio signals are output to a loudspeaker, whereby video images are reproduced on the display, while audio sounds are reproduced by the loudspeaker.

In such kind of video reproducing apparatus, it is known to set a desired position of a video image in reproduced video images as a mark position, thereby allowing the apparatus to have a function of mark setting such that video reproduction thereafter can be started from the mark position. According to a video reproducing apparatus having such function of mark setting, when a key for mark setting provided in an operation unit, such as remote control, is pressed during e.g. reproduction of video images, then the position of a video image in the reproduced video images at the time the key is pressed is set as a mark position.

In order to search a desired position of a video image in the reproduced video images (i.e. desired video scene), it is a general way to first perform fast-forward reproduction. However, according to the conventional video reproducing apparatus as described above, the position of a video image in the video images reproduced at the time the key for mark setting is pressed is set as a mark position. Accordingly, if the key for mark setting is pressed after a desired video scene is found during the fast-forward reproduction, then a position of a video image beyond the desired video scene is undesirably set as a mark position, so that the desired video scene is not properly set as a mark position.

In order to properly set a desired video scene as a mark position in such case, it is needed: to first perform fast-forward reproduction; to find a desired video scene during the fast-forward reproduction; then to perform rewind reproduction back to a position before the desired video scene having thus been found; and thereafter to press the key for mark setting. That is, for properly setting a desired video scene as a mark position, it is needed to once perform rewind operation after the desired video scene is found, and then to perform operation of setting a mark position. This causes operations to be laborious.

SUMMARY OF THE INVENTION

An object of the present invention is to provide a video reproducing apparatus such that a desired video image can be properly set as a mark position by simple operation of mark position setting.

A video reproducing apparatus according to a first aspect of the present invention comprises: reading means to read video image-related data from a recording medium having the video image-related data recorded thereon; video signal generating means to generate video signals for reproduction of video images on the basis of the video image-related data read by the reading means; reproduction control means to control a process of reproducing the video images, using the reading means and the video signal generating means; operating means to perform setting operation for setting a mark position which is referenced by the reproduction control means as a starting position to start reproducing the video images; and mark position setting means to set the mark position in accordance with operation of the operating means by a user.

Therein, in accordance with the setting operation for setting the mark position by the user using the operating means, the mark position setting means sets, as the mark position, a position of a video image presumed as a scene change in video images nearby a position of a video image reproduced at the time the setting operation for setting the mark position is performed.

By such configuration, when the setting operation for setting the mark position is performed by the user using the operating means, then a position of a video image, which is presumed as a scene change in video images nearby a position of a video image reproduced at the time the setting operation for setting the mark position is performed, is set as the mark position. Accordingly, for example, at the time a desired video scene is found during fast-forward reproduction, and setting operation for setting a mark position is performed at such time, then a position, which is presumed as a scene change nearby a position of a video image reproduced at such time, is automatically set as a mark position. Thus, by only performing the setting operation for setting the mark position, e.g. when a desired video scene is found during fast-forward reproduction, it is possible to properly set, as the mark position, the position of the desired video scene, which is positioned at a position of a video image, which is slightly before the position of the video image reproduced at the time the setting operation for setting the mark position is performed.

Preferably, the video reproducing apparatus further comprises scene change search means to search a position of a video image presumed as a scene change in the video images: wherein, in video images on rewind side from the position of a video image reproduced at the time the setting operation is performed, the scene change search means searches a position of a video image presumed as a scene change closest to the position of the video image reproduced at the time the setting operation for setting the mark position is performed by the user using the operating means; and wherein the mark position setting means sets, as the mark position, the position of the video image presumed as the scene change, which is searched by the scene change search means.

Further preferably, in the video reproducing apparatus, the video image-related data read by the reading means are compressed video data, wherein, based on rate of change in amount of data (bit rate) of the compressed video data used per unit time to generate the video signals by the video signal generating means, the scene change search means searches the position of the video image presumed as the scene change.

A video reproducing apparatus according to a second aspect of the present invention comprises: reading means to read video image-related data from a recording medium having the video image-related data recorded thereon; video signal generating means to generate video signals for reproduction of video images on the basis of the video image-related data read by the reading means; reproduction control means to control a process of reproducing the video images, using the reading means and the video signal generating means; operating means to perform setting operation for setting a mark position which is referenced by the reproduction control means as a starting position to start reproducing the video images; and mark position setting means to set the mark position in accordance with operation of the operating means by a user.

Therein, when the user performs a first operation to set the mark position using the operating means, the reproduction control means reproduces the video images in rewind direction from a position of a video image reproduced at the time the first operation is performed, wherein, when the user performs a second operation to set the mark position using the operating means after the first operation, the mark position setting means sets, as the mark position, the position of the video image reproduced at the time the second operation is performed.

By such configuration, when a first operation to set a mark position is performed by a user, video reproduction in rewind direction is automatically started from a position of a video image reproduced at the time the first operation is performed. When a second operation to set the mark position is performed then by the user, the position of the video image reproduced at the time the second operation is performed is set as the mark position. Thus, by only an operation by the user to perform: the first operation e.g. when a desired video scene is found during fast-forward reproduction; and the second operation at a desired time during reproduction in rewind direction which is performed automatically after the first operation, it is possible to set the position of the desired video scene as the mark position.

A video reproducing apparatus according to a third aspect of the present invention comprises: reading means to read video image-related data from a recording medium having the video image-related data recorded thereon; video signal generating means to generate video signals for reproduction of video images on the basis of the video image-related data read by the reading means; reproduction control means to control a process of reproducing the video images, using the reading means and the video signal generating means; operating means to perform setting operation for setting a mark position which is referenced by the reproduction control means as a starting position to start reproducing the video images; and mark position setting means to set the mark position in accordance with operation of the operating means by a user.

Therein, the operating means comprises a mark key to set the mark position: wherein, while the mark key continues to be pressed by the user, the reproduction control means reproduces, in slow mode, the video images in rewind direction from a position of a video image reproduced at the time the mark key starts being pressed; and wherein, when the mark key is released from being pressed, the mark position setting means sets, as the mark position, the position of the video image reproduced at the time the mark key is released.

By such configuration, when a mark key is pressed by a user, video reproduction in slow mode in rewind direction is automatically started from a position of a video image reproduced at the time the mark key is pressed. This video reproduction in slow mode continues while the mark key continues to be pressed by the user. When the mark key is released from being pressed, the position of the video image reproduced at the time the mark key is released is set as a mark position. Thus, by only an operation by the user: to press the mark key e.g. when a desired video scene is found during fast-forward reproduction; and to release, from being pressed, the mark key at a desired time during reproduction in slow mode in rewind direction which is performed automatically after the mark key is pressed, it is possible to properly set the position of the desired video scene as the mark position.

A video reproducing apparatus according to a fourth aspect of the present invention comprises: reading means to read video image-related data from a recording medium having the video image-related data recorded thereon; video signal generating means to generate video signals for reproduction of video images on the basis of the video image-related data read by the reading means; reproduction control means to control a process of reproducing the video images, using the reading means and the video signal generating means; operating means to perform setting operation for setting a mark position which is referenced by the reproduction control means as a staring position to start reproducing the video images; and mark position setting means to set the mark position in accordance with operation of the operating means by a user.

Therein, when the user performs a first operation to set the mark position using the operating means, the reproduction control means reproduces the video images in forward direction from a position of a video image which is back, in a given amount in rewind direction, from a position of a video image reproduced at the time the first operation is performed, wherein, when the user performs a second operation to set the mark position using the operating means after the first operation, the mark position setting means sets, as the mark position, the position of the video image reproduced at the time the second operation is performed.

By such configuration, when a first operation to set a mark position is performed by a user, video reproduction in forward direction is automatically started from a position of a video image which is back, in a given amount in rewind direction, from a position of a video image reproduced at the time the first operation is performed. When a second operation to set the mark position is performed by the user, the position of the video image reproduced at the time the second operation is performed is set as the mark position. Thus, by only an operation by the user to perform: the first operation e.g. when a desired video scene is found during fast-forward reproduction; and the second operation at a desired time during reproduction in forward direction which is performed automatically after the first operation, it is possible to properly set the position of the desired video scene as the mark position.

A video reproducing apparatus according to a fifth aspect of the present invention comprises: reading means to read video image-related data from a recording medium having the video image-related data recorded thereon; video signal generating means to generate video signals for reproduction of video images on the basis of the video image-related data read by the reading means; reproduction control means to control a process of reproducing the video images, using the reading means and the video signal generating means; operating means to perform setting operation for setting a mark position which is referenced by the reproduction control means as a starting position to start reproducing the video images; and mark position setting means to set the mark position in accordance with operation of the operating means by a user.

Therein, the operating means comprises a mark key to set the mark position: wherein, when the mark key is pressed by the user, the reproduction control means starts reproducing, in slow mode, the video images in forward direction from a position of a video image which is back, in a given amount in rewind direction, from a position of a video image reproduced at the time the mark key starts being pressed; wherein, while the mark key continues to be pressed by the user, the reproduction control means continues the reproduction of the video images in slow mode in forward direction; and wherein, when the mark key is released from being pressed, the mark position setting means sets, as the mark position, the position of the video image reproduced at the time the mark key is released.

By such configuration, when the mark key is pressed by a user, video reproduction in slow mode in forward direction is automatically started from a position of a video image which is back, in a given amount in rewind direction, from a position of a video image reproduced at the time the mark key starts being pressed. Then, while the mark key continues to be pressed by the user, the video reproduction in slow mode in forward direction is continued. Thereafter, when the mark key is released from being pressed by the user, the position of the video image reproduced at the time the mark key is released is set as a mark position. Thus, by only an operation by the user: to press the mark key e.g. when a desired video scene is found during fast-forward reproduction; and to release, from being pressed, the mark key at a desired time during reproduction in slow mode in forward direction which is performed automatically after the mark key is pressed, it is possible to properly set the position of the desired video scene as the mark position.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

An embodiment of the present invention will be described hereinafter with reference to the drawings.

Figure 1:
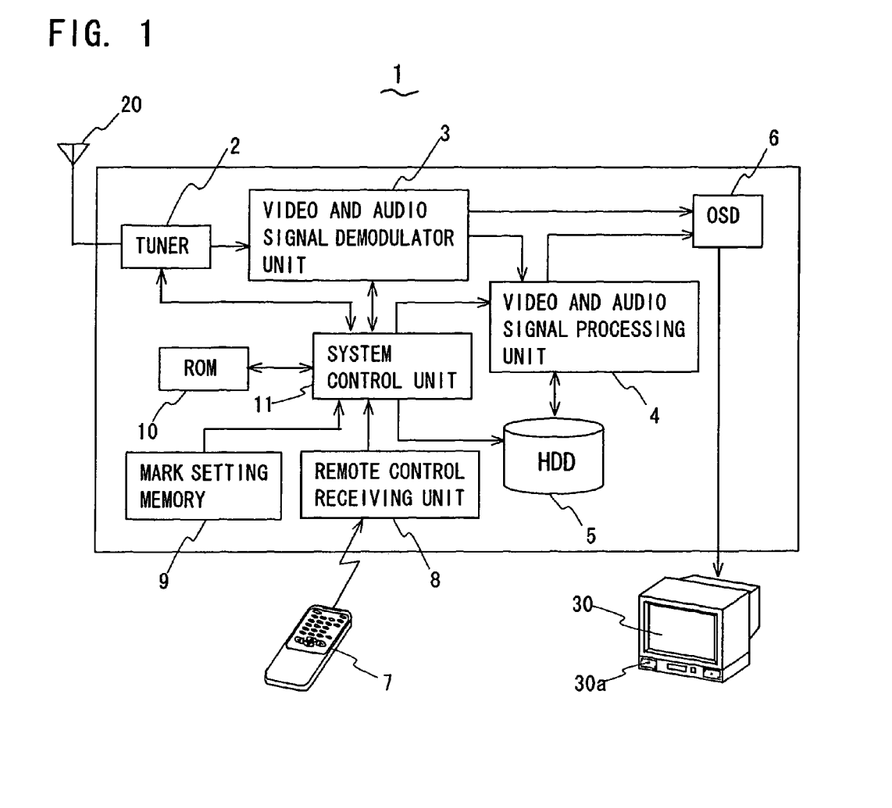
FIG. 1 is a schematic electrical block diagram showing a hard disk recorder as a video reproducing apparatus according to a first embodiment of the present invention.

Referring to FIG. 1, a hard disk recorder 1, which is a video reproducing apparatus, receives television broadcast signals through an antenna 20 connected to the apparatus, the television broadcast signals being broadcast from a broadcasting station. In the hard disk recorder 1, video images and audio sounds from the television broadcast are recorded on a hard disk which is a built-in recording medium in a HDD (hard disk drive) 5, while video images and audio sounds recorded on the hard disk are reproduced by a display 30 and a loudspeaker 30a connected to the apparatus. This hard disk recorder 1 has such function that a desired position of a video image to be reproduced can be set as a mark position by user operation, and thereafter video reproduction can be started from the mark position.

The hard disk recorder 1 comprises: a tuner 2; a video and audio signal demodulator unit 3; a video and audio signal processing unit (video signal generating means) 4; a HDD 5; an OSD (on screen display) processing unit 6; a remote control (operating means) 7; a remote control receiving unit 8; a mark setting memory 9; a ROM (read only memory) 10; and a system control unit (reproduction control means, mark position setting means and scene change search means) 11.

Under the control of the system control unit 11, the tuner 2 receives television broadcast signals through the antenna 20 by tuning its receive frequency to the frequency of the television broadcast signals broadcast from a broadcasting station.

Under the control of the system control unit 11, the video and audio signal demodulator unit 3 demodulates the television broadcast signals received by the tuner 2, and generates video and audio signals to display video images by the display 30 connected to the video reproducing apparatus and to output audio sounds by the loudspeaker 30a. The video and audio signals generated by the video and audio signal demodulator unit 3 are output to the display 30 and the loudspeaker 30a through the OSD processing unit 6. Thus, the video images and audio sounds of the television broadcast are reproduced by the display 30 and the loudspeaker 30a. In addition, the video and audio signals generated by the video and audio signal demodulator unit 3 are output to the video and audio signal processing unit 4.

Under the control of the system control unit 11, the video and audio signal processing unit 4 converts the video and audio signals generated by the video and audio signal demodulator unit 3 into video image-related and audio sound-related data in a given format, and outputs the thus obtained data to the HDD 5. Furthermore, under the control of the system control 11, the video and audio signal processing unit 4 generates video and audio signals on the basis of the video image-related and audio sound-related data output from the HDD 5. The video and audio signals thus generated by the video and audio signal processing unit 4 are output to the display 30 and the loudspeaker 30a through the OSD processing unit 6. Thus, the video images and audio sounds on the basis of the video image-related and audio sound-related data recorded on the HDD 5 are reproduced by the display 30 and the loudspeaker 30a.

Figure 2:
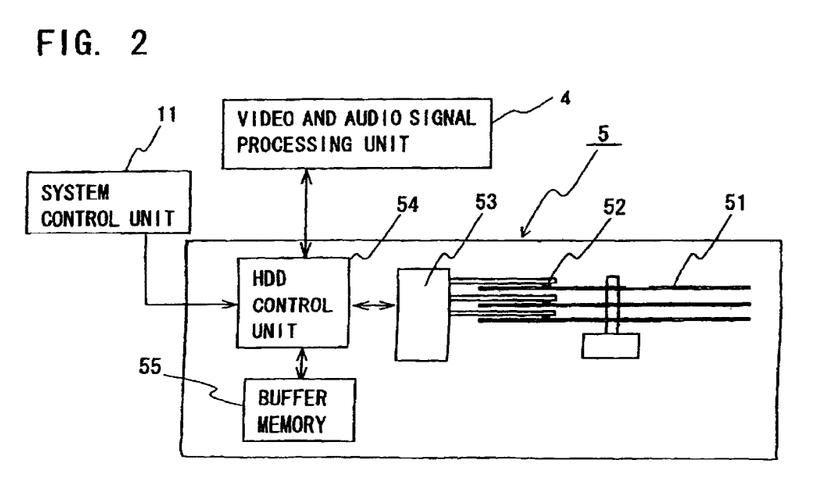
FIG. 2 is a schematic electrical block diagram showing a hard disk drive in the apparatus according to the first embodiment.

The HDD 5 records thereon the video image-related and audio sound-related data in a manner that such data can be read therefrom. As shown in FIG. 2, the HDD 5 comprises: a plurality of hard disks 51 each as a recording medium; a plurality of magnetic heads 52 to record and read data on and from these hard disks 51; a head drive unit 53 to drive the magnetic heads 52; a HDD control unit 54 to control the head drive unit 53 for controlling the recording and reading of data on and from the hard disks 51; and a buffer memory 55 to temporarily store data to record or data having been read. The magnetic head 52, the head drive unit 53 and the HDD control unit 54 constitute reading means to read video image-related and audio sound-related data from the hard disks 51.

Under the control of the system control unit 11, the HDD 5 records, on the hard disks 51, a series of video image-related and audio sound-related data output from the video and audio signal processing unit 4 as one video and audio file (information file). Furthermore, under the control of the system control unit 11, the HDD 5 reads video image-related and audio sound-related data recorded on the hard disks 51, and outputs the thus read data to the video and audio signal processing unit 4.

Under the control of the system control unit 11, the OSD processing unit 6 superimposes various on-screen display signals on the video signals output from the video and audio signal demodulator unit 3 and the video and audio signal processing unit 4. Thereby, video images, having images in accordance with the on-screen display signals superimposed thereon, are displayed on the display 30.

Figure 3:
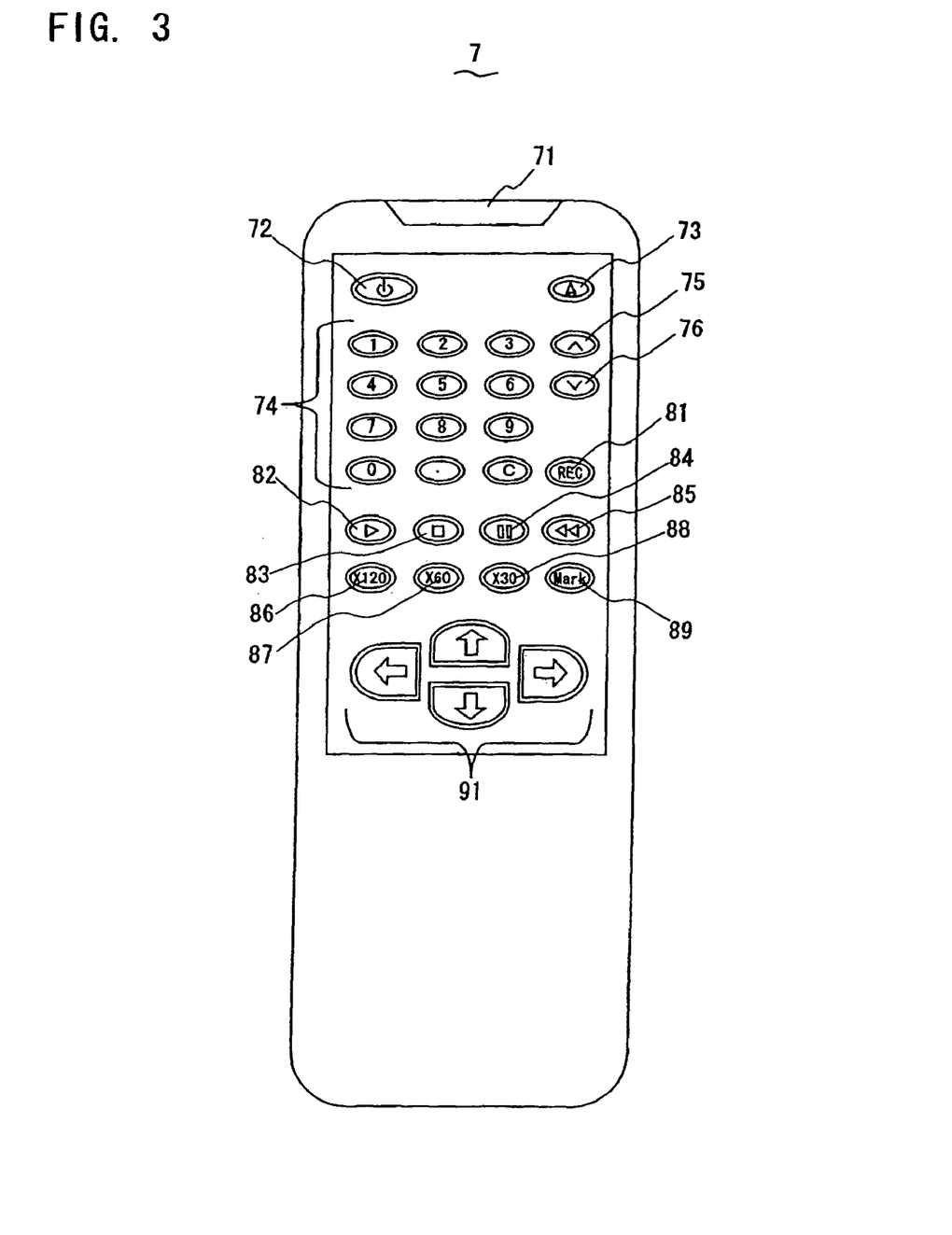
FIG. 3 is a schematic plan view showing a remote control in the apparatus according to the first embodiment, having operation keys.

The remote control 7 is provided to perform various operations of the hard disk recorder 1. As shown in FIG. 3, the remote control 7 comprises a power supply key 72, a menu key 73, numeric keys 74, a volume up key 75 and a volume down key 76. The remote control 7 further comprises a REC (record) key, a reproduction (playback) key 82, a stop key 83, a pause key 84, a rewind reproduction (rewind playback) key 85, fast-forward reproduction (fast-forward playback) keys 86, 87 and 88, a mark key 89 and a cursor key 91. When these operating keys of the remote control 7 are pressed one at a time, infrared code signals corresponding to operations by the operating keys, respectively, are transmitted from a light emitting unit 71.

The power supply key 72 is provided to switch on and off a power supply of a main body of the hard disk recorder 1. The menu key 73 is a key to display, on the display 30, a menu screen to select and command various operations of the hard disk recorder 1. The numeric keys 74 are keys for e.g. channel selection of television broadcast signals. The volume up key 75 is a key to increase volume, while the volume down key 76 is a key to decrease volume.

The REC key 81 is a key to record, on the hard disks 51, the video images and audio sounds, while they are being received from the television broadcast. The reproduction key 82 is a key to normally reproduce video images and audio sounds recorded on the hard disks 51. The stop key 83 is a key to stop the reproduction of video images and audio sounds. The pause key 84 is a key to pause video images and audio sounds while being reproduced. The rewind reproduction key 85 is a key to reproduce, in rewind direction (toward beginning of the video and audio file), video images and audio sounds recorded on the hard disks 51. The fast-forward reproduction keys 86, 87 and 88 are keys to reproduce video images and audio sounds, recorded on the hard disks 51, in forward direction (toward ending of the video and audio file) at speeds 120 times, 60 times and 30 times as fast as the speed in the case of the normal reproduction, respectively.

The mark key 89 is a key to set a position of a video image, in the video and audio file, as a mark position which can be made as a starting position to start reproducing video images and audio sounds recorded on the hard disks 51. The cursor key 91 is a key to be used for operations on a menu screen such as moving a cursor, selecting items and selecting video and audio files.

The remote control receiving unit 8, as shown in FIG. 1, receives the infrared signals transmitted from the remote control 7, and converts them to electric signals. The remote control receiving unit 8 further outputs, to the system control unit 11, signals corresponding to operations of the remote control 7. Under the control of the system control unit 11, the mark setting memory 9 stores data of a mark position which can be made as a starting position to start reproducing video images and audio sounds recorded on the hard disks 51 (refer to FIG. 2). The ROM 10 stores operating programs of the system control unit 11.

In response to the operation of the remote control 7, the system control unit 11 controls the recording of the video images and audio sounds from the television broadcast onto the hard disks 51, and also controls the normal reproduction, rewind reproduction and fast-forward reproduction of video images and audio sounds recorded on the hard disks 51. In response to the operation of the remote control 7, furthermore, the system control unit 11 controls: setting of the mark position; starting of reproducing video images from the mark position; and operations of the hard disk recorder 1 and so on.

Figure 4:
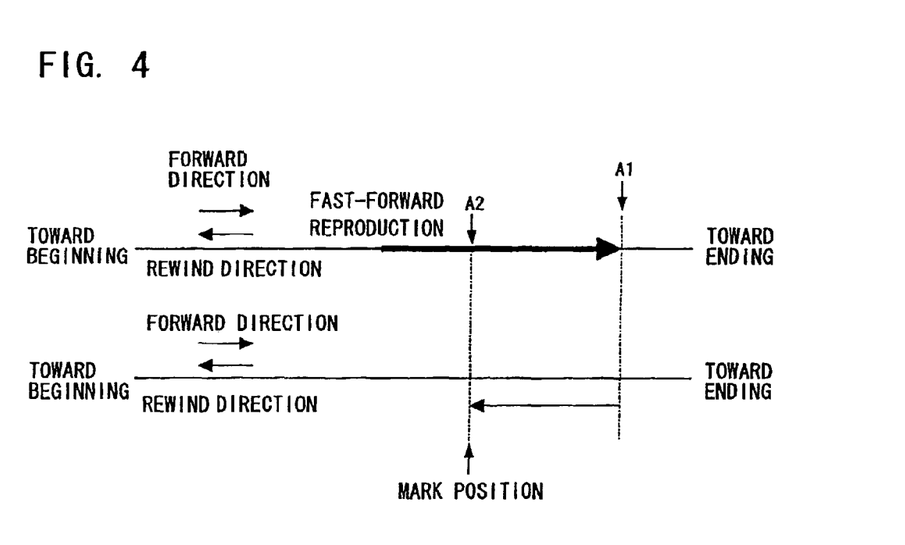
FIG. 4 is a schematic image chart to explain how a mark position is set in the apparatus according to the first embodiment.

In the following, it will be described how a mark position is set. The setting of a mark position is performed by operating the mark key 89 (refer to FIG. 3) of the remote control 7 during fast-forward reproduction of video images and audio sounds. Referring to FIG. 4, a case will be described where an operation (i.e. a mark setting operation) of pressing the mark key 89 is performed during fast-forward reproduction of video images and audio sounds. By this mark setting operation, a position (position A2 in the drawing) of a video image in the video and audio file, which position is presumed as a scene change closest to a position (position A1 in the drawing) of a video image in the video and audio file reproduced at the time the mark key 89 is pressed, is set as a mark position, out of positions of video images on rewind side from the position (position A1 in the drawing) of such reproduction of a video image in the video and audio file having been thus reproduced.

This position of a video image, which is presumed as a scene change, is automatically searched by the system control unit 11 in a manner such as follows. Based on rate of change in amount of data (bit rate) of the compressed video data used per unit time to generate the video signals by the video and audio signal processing unit 4, the system control unit 11 searches a point in the video images where the bit rate abruptly increases or abruptly decreases, wherein such point is a position of a video image in the video images, which is presumed as a scene change. In each video and audio file, it is possible to set plural positions as mark positions, wherein address data to indicate the mark positions are stored in the mark setting memory 9, with such address data being associated with each video and audio file.

Figure 5:
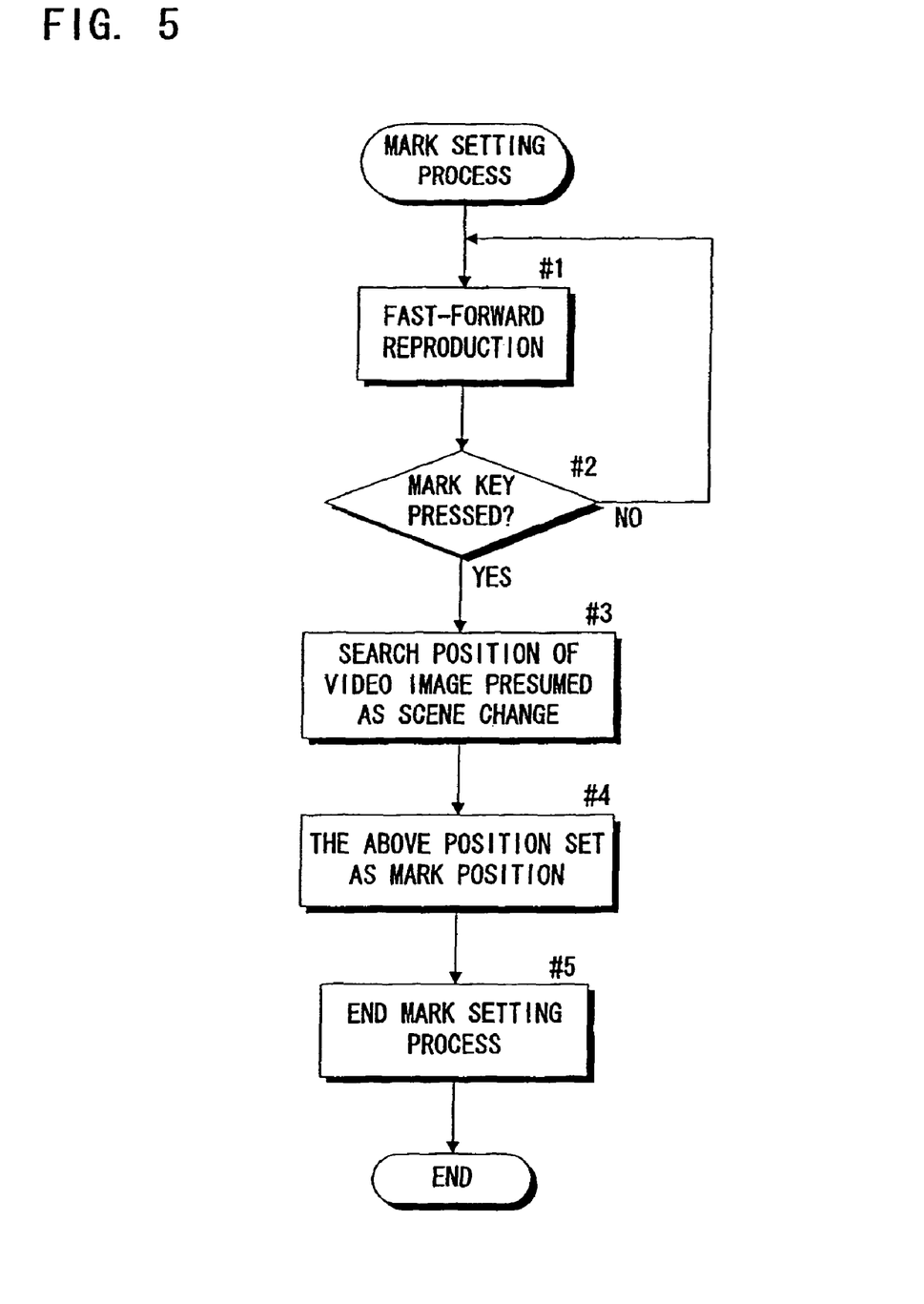
FIG. 5 is a schematic flow chart showing a process of setting the mark position in the apparatus according to the first embodiment.

Next, referring to the flow chart of FIG. 5, it will be described how the hard disk recorder 1 having the above-described configuration performs a mark setting process. To begin with, during fast-forward reproduction of video images and audio sounds (#1), the system control unit 11 decides whether or not the mark key 89 has been pressed (#2). It is to be noted here that the fast-forward reproduction of video images and audio sounds is performed in a manner: either to select a video and audio file by operating the keys of the remote control 7 such as the menu key 73 and the cursor key 91, and by pressing one of the fast-forward reproduction keys 86, 87 and 88; or to press one of the fast-forward reproduction keys 86, 87 and 88 during normal reproduction of a video and audio file.

Now, the mark key 89 is pressed (YES in #2). Then, based e.g. on rate of change in bit rate of the compressed video data, the system control unit 11 searches a position of a video image, presumed as a scene change, in a zone of video images in the video and audio file on rewind side within a given time (for example 5 seconds) from the position of the video image reproduced at the time the mark key 89 was pressed (#3). Then, the system control unit 11 stores, in the mark setting memory 9, address data of the position of the video image presumed as a scene change having thus been detected by the search, whereby the position of the video image presumed as a scene change is set as a mark position (#4).

In this case, when the system control unit 11 could detect plural positions of video images, presumed as plural scene changes, in the zone of video images on rewind side within the given time, then the position of the video image, which is presumed as the scene change closest to the position of the video image reproduced at the time the mark key 89 was pressed, is set as a mark position. On the other hand, when the system control unit 11 could not detect any position of a video image, presumed as a scene change, in the zone of the video images on rewind side within the given time, then a position of a video image, which is back, in a given time in rewind direction, from the position of the video image reproduced at the time the mark key 89 was pressed, is set as a mark position. After the setting of the mark position, the system control unit 11 ends the mark setting process (#5).

According to the hard disk recorder 1 having such configuration, when the mark key 89 of the remote control 7 is pressed during fast-forward reproduction of video images and audio sounds (i.e. when a mark setting operation to set a mark position is performed), a position of a video image, which is presumed as a scene change closest to and on rewind side from the position of the video image reproduced at the time the mark key 89 was pressed, is set as a mark position. Accordingly, by only an operation: to find a desired video scene e.g. during fast-forward reproduction; and to press the mark key 89 at such time, it is possible to automatically set, as a mark position, a position of a video image presumed as a scene change closest to and on rewind side from the position of the video image reproduced at such time.

Figure 6:
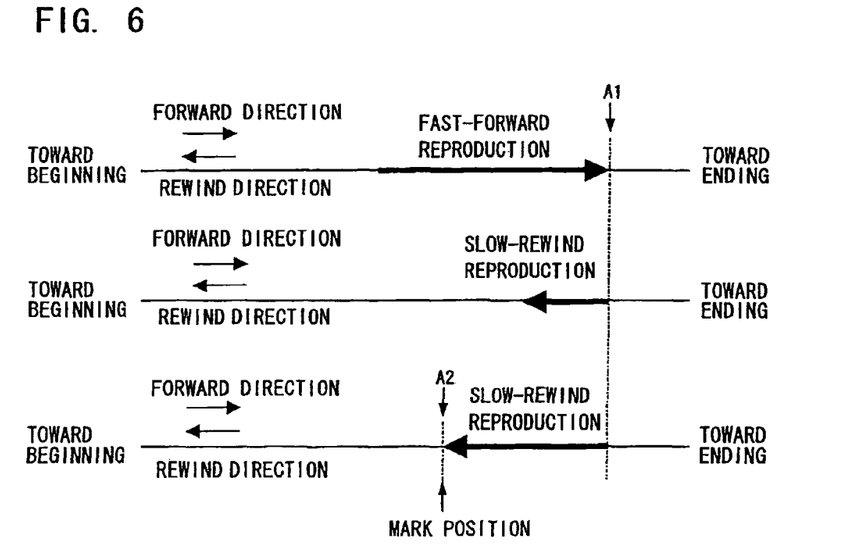
FIG. 6 is a schematic image chart to explain how a mark position is set in a hard disk recorder as a video reproducing apparatus according to a second embodiment of the present invention.

Hereinafter, a second embodiment according to the present invention will be described. As shown in FIG. 6, operations in the hard disk recorder 1 according to the present second embodiment are performed as follows. When the mark key 89 is pressed (i.e. first operation to set a mark position is performed) by a user during fast-forward reproduction of video images and audio sounds, reproduction of video images and audio sounds is automatically started in slow mode in rewind direction from the position (position A1 in the drawing) of a video image in the video and audio file reproduced at the time the mark key 89 was pressed. While the mark key 89 continues to be pressed by the user, the reproduction (slow-rewind reproduction) of the video images and audio sounds in slow mode in rewind direction continues. Thereafter, when the mark key 89 is released from being pressed (i.e. second operation to set the mark position is performed), the position (position A2 in the drawing) of the video image reproduced at the time the mark key 89 was released is set as a mark position. Other portions of the configuration according to the present second embodiment are the same as those according to the above-described first embodiment.

Figure 7:
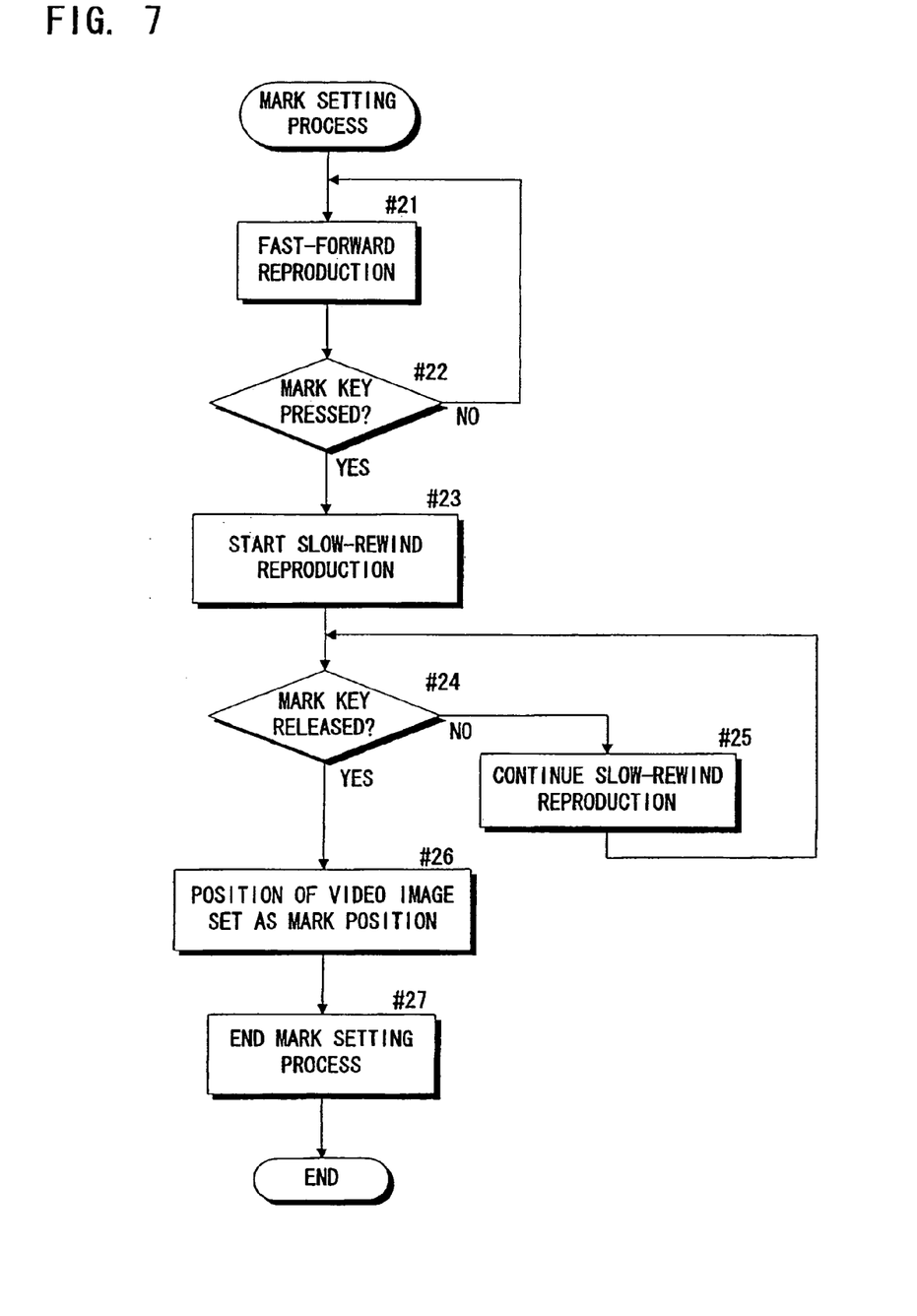
FIG. 7 is a schematic flow chart showing a process of setting the mark position in the apparatus according to the second embodiment.

Next, referring to the flow chart of FIG. 7, it will be described below how the hard disk recorder 1 according to the present second embodiment performs a mark setting process. To begin with, during fast-forward reproduction of video images and audio sounds (#21), the system control unit 11 decides whether or not the mark key 89 of the remote control 7 has been pressed (#22). When the mark key 89 is pressed (YES in #22), the system control unit 11 starts reproduction of video images and audio sounds in slow mode in rewind direction from the position of a video image reproduced at the time the mark key 89 was pressed (#23). Then, unless the mark key 89 is released from being pressed (NO in #24), the system control unit 11 continues the reproduction of video images and audio sounds in slow mode in rewind direction (#25).

Thereafter, when the mark key 89 is released from being pressed (YES in #24), the system control unit 11 stores, in the mark setting memory 9, address data of the position of the video image reproduced at the time the mark key 89 was released from being pressed, whereby the position of the video image reproduced at such time is set as a mark position (#26). After the setting of the mark position, the system control unit 11 ends the mark setting process (#27).

According to the hard disk recorder 1 having such configuration, when the mark key 89 of the remote control 7 is pressed during fast-forward reproduction of video images and audio sounds (i.e. when the first operation to set a mark position is performed), reproduction of video images and audio sounds is automatically started in slow mode in rewind direction from the position of a video image in the video and audio file reproduced at the time the mark key 89 was pressed. While the mark key 89 continues to be pressed, this reproduction of the video images and audio sounds in slow mode in rewind direction continues. Thereafter, when the mark key 89 is released from being pressed (i.e. when the second operation to set the mark position is performed), the position of the reproduction of the video image reproduced at the time the mark key 89 was released is set as a mark position. Accordingly, a desired video scene can be properly set as a mark position by only an operation: to press the mark key 89 when a desired video scene is found during fast-forward reproduction; and to release, from being pressed, the mark key 89 at a desired time during reproduction in slow mode in rewind direction which is performed automatically after the mark key 89 is pressed.

Figure 8:
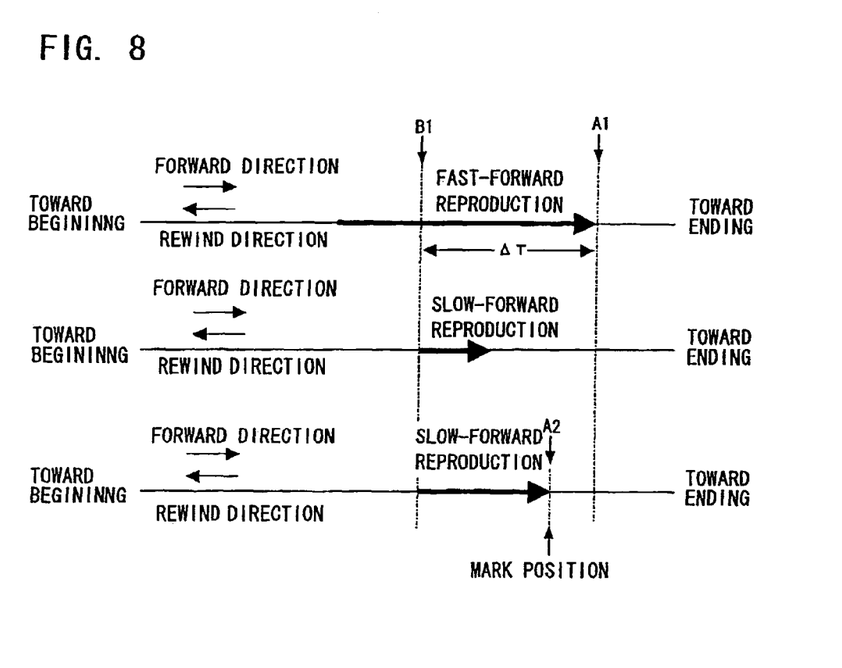
FIG. 8 is a schematic image chart to explain how a mark position is set in a hard disk recorder as a video reproducing apparatus according to a third embodiment of the present invention.

Hereinafter, a third embodiment according to the present invention will be described. As shown in FIG. 8, operations in the hard disk recorder 1 according to the present third embodiment are performed as follows. When the mark key 89 is pressed (i.e. first operation to set a mark position is performed) by a user during fast-forward reproduction of video images and audio sounds, reproduction of video images and audio sounds is automatically started in slow mode in forward direction (toward ending of the video and audio file) from a position (position B1 in the drawing), which is back, in a given amount $\Delta T$ (e.g. 5 second zone) in rewind direction, from the position (position A1 in the drawing) of a video image in the video and audio file reproduced at the time the mark key 89 was pressed. While the mark key 89 continues to be pressed by the user, the reproduction (slow-forward reproduction) of the video images and audio sounds in slow mode in forward direction continues. Thereafter, when the mark key 89 is released from being pressed (i.e. second operation to set the mark position is performed), the position (position A2 in the drawing) of the video image reproduced at the time the mark key 89 was released from being pressed is set as a mark position. The value of the given amount $\Delta T$ is preset, and its data is stored in an internal memory of the system control unit 11. Other portions of the configuration according to the present third embodiment are the same as those according to the above-described first and second embodiments.

Figure 9:
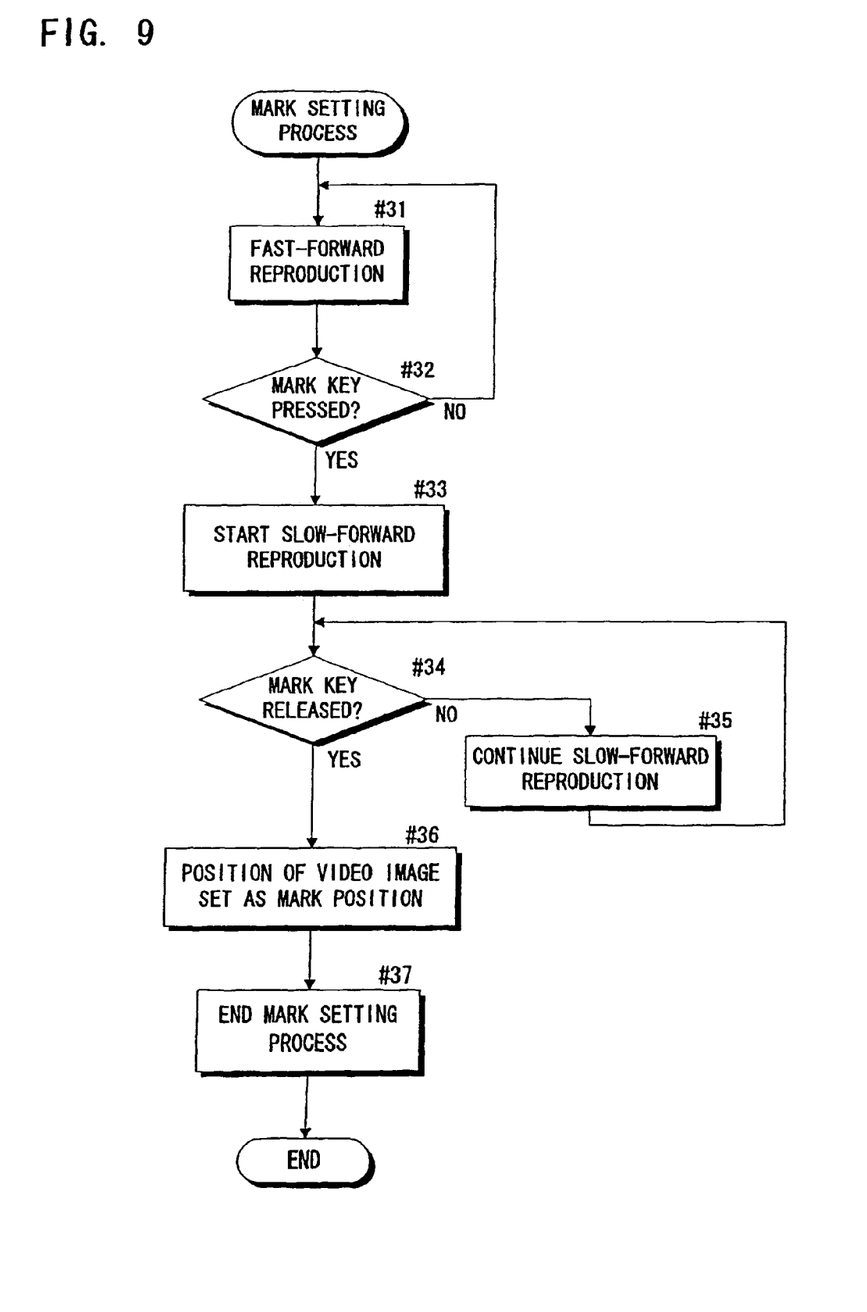
FIG. 9 is a schematic flow chart showing a process of setting the mark position in the apparatus according to the third embodiment.

Next, referring to the flow chart of FIG. 9, it will be described below how the hard disk recorder 1 according to the present third embodiment performs a mark setting process. To begin with, during fast-forward reproduction of video images and audio sounds (#31), the system control unit 11 decides whether or not the mark key 89 of the remote control 7 has been pressed (#32). When the mark key 89 is pressed (YES in #32), the system control unit 11 starts reproduction of video images and audio sounds in slow mode in forward direction from the position, which is back, in a given amount ΔT in rewind direction, from the position of a video image reproduced at the time the mark key 89 was pressed (#33). Then, unless the mark key 89 is released from being pressed (NO in #34), the system control unit 11 continues the reproduction of video images and audio sounds in slow mode in forward direction (#35).

Thereafter, when the mark key 89 is released from being pressed (YES in #34), the system control unit 11 stores, in the mark setting memory 9, address data of the position of the video image reproduced at the time the mark key 89 was released from being pressed, whereby the position of the video image reproduced at such time is set as a mark position (#36). After the setting of the mark position, the system control unit 11 ends the mark setting process (#37).

According to the hard disk recorder 1 having such configuration, when the mark key 89 of the remote control 7 is pressed during fast-forward reproduction of video images and audio sounds (i.e. when the first operation to set a mark position is performed), reproduction of video images and audio sounds is automatically started in slow mode in forward direction from a position, which is back, in a given amount ΔT in rewind direction, from the position of a video image in the video and audio file reproduced at the time the mark key 89 was pressed. While the mark key 89 continues to be pressed, this reproduction of the video images and audio sounds in slow mode in forward direction continues. Thereafter, when the mark key 89 is released from being pressed (i.e. when the second operation to set the mark position is performed), the position of the video image reproduced at the time the mark key 89 was released is set as a mark position. Accordingly, a desired video scene can be properly set as a mark position by only an operation: to press the mark key 89 when a desired video scene is found during fast-forward reproduction; and to release, from being pressed, the mark key 89 at a desired time during reproduction in slow mode in forward direction which is performed automatically after the mark key 89 is pressed.

It is to be noted that the present invention is not limited to such configurations as in the above-described embodiments, and various modifications are possible. For example, in the above-described first embodiment, the rate of change in bit rate of the compressed video data is not an only factor, based on which a position of a video image presumed as a scene change can be detected. The detection can be performed based e.g. on variation in presence and absence of audio sounds or on rate of change in frames of the video images as well. Furthermore, the detection can also be performed by making an overall judgment based on the variation in presence and absence of audio sounds, the rate of change in bit rate of the compressed video data, and the rate of change in frames of the video images.

In the above-described second embodiment, the reproduction of video images and audio sounds in slow mode in rewind direction, while the mark key 89 continues to be pressed, can be replaced by reproduction of video images and audio sounds in rewind direction at a normal speed or at a speed faster than the normal speed to some extent. Likewise, in the above-described third embodiment, the reproduction of video images and audio sounds in slow mode in forward direction, while the mark key 89 continues to be pressed, can be replaced by reproduction of video images and audio sounds in forward direction at a normal speed or at a speed faster than the normal speed to some extent. Furthermore, in the above-described second and third embodiments, the operation of pressing the mark key 89 and the operation of releasing the mark key 89 from being pressed, which are made to perform a mark setting process, can be replaced e.g. by a first operation of pressing the mark key 89 and a second operation of pressing the mark key 89 in order to perform a similar mark setting process.

Besides, in the above-described first, second and third embodiments, the setting operation for setting a mark position as having been described to be performed during fast-forward reproduction can be so modified as to be performed by operating the mark key 89 during rewind reproduction or normal reproduction, not limiting to the fast-forward reproduction. In addition, the present invention can be applied to various audio reproducing apparatus such as DVD (digital video disk) players, not limiting to hard disk recorders.

This application is based on Japanese patent application 2003-150146 filed May 28, 2003 in Japan, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A video reproducing apparatus comprising:
   reading means to read video image-related data from a recording medium having the video image-related data recorded thereon;
   video signal generating means to generate video signals for reproduction of video images on the basis of the video image-related data read by the reading means;
   reproduction control means to control a process of reproducing the video images, using the reading means and the video signal generating means;
   operating means to perform setting operation for setting a mark position which is referenced by the reproduction control means as a starting position to start reproducing the video images; and
   mark position setting means to set the mark position in accordance with operation of the operating means by a user,
   wherein, in accordance with the setting operation for setting the mark position by the user using the operating means, the mark position setting means automatically sets, as the mark position, a position of a video image presumed as a scene change in video images nearby a position of a video image reproduced at the time the setting operation for setting the mark position is performed.

2. The video reproducing apparatus according to claim 1, which further comprises scene change automatic search means to automatically search a position of a video image presumed as a scene change in the video images,
   wherein, in video images on rewind side from the position of a video image reproduced at the time the setting operation is performed, the scene change automatic search means automatically searches a position of a video image presumed as a scene change closest to the position of the video image reproduced at the time the setting operation for setting the mark position is performed by the user using the operating means, and
   wherein the mark position setting means automatically sets, as the mark position, the position of the video image presumed as the scene change, which is searched by the scene change automatic search means.

3. The video reproducing apparatus according to claim 2, wherein the video image-related data read by the reading means are compressed video data, and wherein, based on rate of change in amount of data (bit rate) of the compressed video data used per unit time to generate the video signals by the video signal generating means, the scene change automatic search means automatically searches the position of the video image presumed as the scene change.

4. The video reproducing apparatus according to claim 3, wherein, based on variation in presence and absence of audio sounds, the scene change automatic search means automatically searches the position of the video image presumed as the scene change.

5. The video reproducing apparatus according to claim 4, wherein, based on rate of change in frames of the video images, the scene change automatic search means automatically searches the position of the video image presumed as the scene change.

* * * * *